United States Patent
Zander et al.

(10) Patent No.: US 10,370,570 B2
(45) Date of Patent: Aug. 6, 2019

(54) LOW-MODULUS SILYLATED POLYURETHANES

(71) Applicant: Henkel AG & Co. KGAA, Duesseldorf (DE)

(72) Inventors: Lars Zander, Altoetting (DE); Helmut Loth, Haan (DE); Marc Pascal Burmeister, Duesseldorf (DE); Rolf Tenhaef, Duesseldorf (DE); Johann Klein, Duesseldorf (DE); Jan-Erik Damke, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/741,758

(22) Filed: Jun. 17, 2015

(65) Prior Publication Data

US 2015/0284610 A1    Oct. 8, 2015

Related U.S. Application Data

(63) Continuation of application No. PCT/EP2013/076582, filed on Dec. 13, 2013.

(30) Foreign Application Priority Data

Dec. 17, 2012 (DE) .................. 10 2012 223 422

(51) Int. Cl.
| | |
|---|---|
| C08G 18/08 | (2006.01) |
| C08G 18/10 | (2006.01) |
| C08G 18/12 | (2006.01) |
| C08K 5/00 | (2006.01) |
| C09J 175/08 | (2006.01) |
| C09K 3/10 | (2006.01) |

(52) U.S. Cl.
CPC ........ *C09J 175/08* (2013.01); *C08G 18/0852* (2013.01); *C08G 18/10* (2013.01); *C08G 18/12* (2013.01); *C08K 5/0016* (2013.01); *C09K 3/1021* (2013.01); *C08J 2375/08* (2013.01)

(58) Field of Classification Search
CPC .. C08K 5/0016; C08G 18/0852; C08G 18/10; C08G 18/12; C09J 175/08; C09J 2375/08; C09K 3/1021
See application file for complete search history.

(56) References Cited

U.S. PATENT DOCUMENTS

| | | | | |
|---|---|---|---|---|
| 4,501,852 A * | 2/1985 | Markusch | .......... | C08G 18/0819 |
| | | | | 524/591 |
| 4,590,254 A * | 5/1986 | Chang | ............... | C08G 18/0852 |
| | | | | 528/49 |
| 4,990,357 A * | 2/1991 | Karakelle | ............ | A61L 29/085 |
| | | | | 427/2.12 |
| 5,147,927 A * | 9/1992 | Baghdachi | ............. | C08G 18/10 |
| | | | | 524/710 |
| 5,614,604 A | 3/1997 | Krafcik | | |
| 6,809,170 B2 | 10/2004 | Roesler et al. | | |
| 7,025,093 B2 * | 4/2006 | Bonnet | .................. | C08G 18/69 |
| | | | | 137/375 |
| 8,431,675 B2 | 4/2013 | Braun et al. | | |
| 2006/0270770 A1 * | 11/2006 | Feng | ....................... | C08K 5/54 |
| | | | | 524/268 |
| 2010/0009582 A1 | 1/2010 | Koecher et al. | | |

FOREIGN PATENT DOCUMENTS

| | | |
|---|---|---|
| CN | 1871269 A | 11/2006 |
| CN | 102492389 A | 6/2012 |
| DE | 10 2007 058483 | 6/2009 |
| EP | 0070475 | 1/1983 |
| EP | 0931800 | 7/1999 |
| EP | 1607460 A2 | 12/2005 |
| EP | 2103648 | 9/2009 |
| EP | 2143746 | 1/2010 |

(Continued)

OTHER PUBLICATIONS

International Search Report issued in connection with International Patent Application No. PCT/EP2013/076582 dated Jun. 24, 2014.

*Primary Examiner* — Patrick D Niland
(74) *Attorney, Agent, or Firm* — James E. Piotrowski

(57) ABSTRACT

A method for producing a silylated polyurethane that comprises the following steps: (1) reacting at least one polyether polyol having a number average molecular weight of at least 2,000 g/mol with at least one polyisocyanate in the presence of at least one solvent; (2) reacting the reaction product of step (1) with at least one silane of formula (I) A-R—SiXYZ (I), where A means —$NH_2$ or —NHB, wherein B stands for a branched or linear alkyl radical with 1-12 C atoms, possibly having functional groups, a cyclic alkyl radical having 5-8 C atoms, or an aryl radical, R is a divalent hydrocarbon radical having 1-12 C atoms, and X, Y, Z are substituents on the Si atom and are independently of each other $C_1$-$C_8$ alkyl, $C_1$-$C_8$ alkoxy or $C_1$-$C_8$ acyloxy groups, wherein at least one of radicals X, Y, Z is a $C_1$-$C_8$ alkoxy or $C_1$-$C_8$ acyloxy group, in the presence of at least one solvent. Further disclosed is a silylated polyurethane that can be produced by the method, a curable composition based thereon, and the use of such a composition as an adhesive, sealant and/or coating material.

7 Claims, No Drawings

(56) References Cited

FOREIGN PATENT DOCUMENTS

| | | | |
|---|---|---|---|
| JP | S5460399 | A | 5/1979 |
| JP | H05209122 | A | 8/1993 |
| JP | H11181350 | A | 7/1999 |
| JP | 2006002008 | A | 1/2006 |
| WO | WO 2005/042606 | * | 5/2005 |
| WO | 2009071542 | | 6/2009 |

* cited by examiner

LOW-MODULUS SILYLATED POLYURETHANES

The present invention relates to the field of silylated polyurethanes as used, for example, in adhesives, sealants, and coatings. In particular, the invention proposes a novel method for producing silylated polyurethanes. The invention further relates to a polyurethane resulting from a method according to the invention, and to a curable composition which contains a polyurethane of this type. Lastly, the invention relates to the use of such a composition as an adhesive, sealant, and/or coating.

One-component moisture-curing adhesives and sealants have played an important role in numerous technical applications for years. In addition to the polyurethane adhesives and sealants containing free isocyanate groups, and the traditional silicone materials, adhesives, and sealants based on dimethylpolysiloxanes, the so-called silane-modified adhesives and sealants have also been increasingly used in recent times. Compared to polyurethane adhesives and sealants, silane-modified adhesives and sealants have the advantage that they are free of isocyanate groups, in particular monomeric diisocyanates. In addition, they are characterized by a broad adhesion spectrum on a variety of substrates without pretreatment of the surface with primer.

Polymer systems having reactive silyl groups are thus known in principle. In the presence of atmospheric moisture, polymers which contain silyl groups with hydrolyzable substituents are able, even at room temperature, to condense with one another with cleavage of the hydrolyzed radicals. Depending on the content of silyl groups with hydrolyzable substituents, and the structure of these silyl groups, primarily long-chain polymers (thermoplastics), relatively wide-mesh, three-dimensional networks (elastomers), or highly crosslinked systems (thermosetting plastics) form. The polymers generally have an organic base structure bearing alkoxy or acyloxysilyl groups, for example, at the ends. The organic base structure may consist of, for example, polyurethane, polyester, polyether, etc.

EP 0 931 800 A1 describes the production of silylated polyurethanes by reacting a polyol component having a low degree of terminal unsaturation with a diisocyanate component to produce a hydroxy-terminated prepolymer, which is subsequently capped with an isocyanatosilane. The polyurethanes obtained in this manner are characterized by good mechanical properties with acceptable curing times.

The capping of polyurethane prepolymers which contain reactive terminal hydrogen atoms with isocyanatosilanes bearing at least one hydrolyzable alkoxy group on the silicon atom is also the subject matter of EP 0 070 475 A2. The moisture-curable polymers obtained in this manner may advantageously be used in sealing compounds.

WO 2009/071542 A1 describes a method for producing a silylated polyurethane, the method comprising the reaction of at least one polyol compound having a molecular weight of 4,000 to 30,000 g/mol and at least one compound which is monofunctional with respect to isocyanates and contains at least one diisocyanate. There is an excess of the sum total of polyol compounds and monofunctional compounds with respect to the diisocyanates, so that a hydroxy-terminated polyurethane prepolymer is formed which is subsequently reacted with isocyanatosilane.

There is a continuing need for isocyanate-free compositions for use in adhesives and/or sealants, which have acceptable curing times and good mechanical properties after curing. For example, it is advantageous for many applications when the compositions have good extensibility, and at the same time a high restoring force, after curing.

The object of the present invention, therefore, is to provide compositions which after curing have good extensibility, as manifested in a high elongation at break and the lowest possible modulus of elasticity, in conjunction with a high restoring force.

The object is achieved by compositions which are based on silylated polyurethanes and which are produced according to a special method. A first subject matter of the present invention therefore relates to a method for producing a silylated polyurethane, comprising the following steps:

(1) reacting
 at least one polyether polyol having a number average molecular weight of at least 2,000 g/mol, preferably at least 15,000 g/mol, with at least one polyisocyanate
 in the presence of at least one solvent;
(2) reacting
 the reaction product from step (1) with at least one silane of formula (I)

$$A-R-SiXYZ \quad (I),$$

wherein A means —$NH_2$ or —NHB, where B stands for a branched or linear alkyl radical which contains 1-12 C atoms and optionally functional groups, for example one or more ester, ether, or amide groups, or stands for a cyclic alkyl radical containing 5-8 C atoms, or an aryl radical preferably containing 6-10 C atoms, R is a divalent hydrocarbon radical containing 1-12 C atoms, and X, Y, Z are substituents on the Si atom and independently stand for $C_1$-$C_8$ alkyl, $C_1$-$C_8$ alkoxy, or $C_1$-$C_8$ acyloxy groups, at least one of the radicals X, Y, Z standing for a $C_1$-$C_8$ alkoxy or $C_1$-$C_8$ acyloxy group, in the presence of at least one solvent.

According to the invention, a "polyurethane" is understood to mean a polymer which has at least two urethane groups —NH—CO—O— which connect the segments of the macromolecule.

According to the invention, the term "react" means bringing certain substances into contact in such a way that these substances enter into a chemical reaction with one another, the substances of course being constituted in such a way that a chemical reaction can take place.

According to the invention, a "polyol" is understood to mean a polymer which has at least two OH groups. In principle, various polymers which bear at least two OH groups may be referred to as polyols, such as polyesters, in particular polycaprolactones, for example, as well as polybutadienes or polyisoprenes and the hydrogenation products thereof, or also polyacrylates and/or polymethacrylates. Mixtures of various polyols may also be included.

According to the invention, a polyether polyol is used as the polyol. A polyether is understood to mean a polymer whose organic repeating units contain ether functionalities C—O—C in the main chain. Thus, polymers having side-position ether groups such as cellulose ethers, starch ethers, and vinyl ether polymers, for example, are not included in the polyethers. In addition, polyacetals such as polyoxymethylene (POM) are not included in the polyethers.

Polyethers have a flexible, elastic structure, and may be used to produce compositions having excellent elastic properties. Polyethers have a base structure which is not only flexible, but also resistant. Thus, polyethers are not attacked or decomposed by water and bacteria, for example, in contrast to polyesters, for example.

In one preferred embodiment of the present invention, the polyol is a polyalkylene oxide, particularly preferably polyethylene oxide and/or polypropylene oxide.

Particularly advantageous viscoelastic properties may be achieved when polyethers having a narrow molar mass distribution, and thus low polydispersity, are used. These polyethers are producible by so-called double metal cyanide (DMC) catalysis, for example. Polyethers produced in this way are characterized by a particularly narrow molar mass distribution, a high average molar mass, and a very low number of double bonds at the ends of the polymer chains.

In one special embodiment of the present invention, the polyol is therefore a polyether polyol whose maximum polydispersity $M_w/M_n$ is 3, particularly preferably 1.7, for example 1.5, and very particularly preferably 1.3.

According to the invention, the number average molecular weight of the polyol is at least 2,000 g/mol, preferably at least 5,000 g/mol, more preferably at least 10,000 g/mol, particularly preferably at least 15,000 g/mol, and very particularly preferably at least 16,000 g/mol. According to the invention, the number average molecular weight $M_n$, the same as the weight average molecular weight $M_w$, is determined by gel permeation chromatography (GPC, also referred to as SEC) against a polystyrene standard. This method is known to those skilled in the art. The polydispersity is derived from the average molecular weights $M_w$ and $M_n$, and is calculated as $PD=M_w/M_n$.

The ratio $M_w/M_n$ (polydispersity) indicates the spread of the molar mass distribution, and thus the different degrees of polymerization of the individual chains in polydisperse polymers. For many polymers and polycondensates, the polydispersity has a value of approximately 2. A high degree of monodispersity would be indicated by a value of 1. A low polydispersity of less than 1.5, for example, indicates a comparatively narrow molecular weight distribution, and thus a specific characteristic with properties related to the molecular weight, such as the viscosity.

The polyol preferably has a number average molecular weight of 2,000 to 30,000 g/mol. Such molecular weights are particularly advantageous, since the resulting polyurethanes or the compositions based on same have a balanced ratio of viscosity (easy processability) prior to curing, and strength and elasticity after curing. In a first embodiment, the number average molecular weight is preferably 3,000 to 15,000 g/mol, in particular 4,000 to 12,000 g/mol. In a second embodiment, the number average molecular weight is preferably 16,000 to 30,000 g/mol, in particular 17,500 to 24,000 g/mol.

According to the invention, a polyisocyanate is understood to mean a compound which has at least two isocyanate groups —NCO. This compound does not have to be a polymer, and instead is frequently a low-molecular compound. The polyisocyanate is preferably a diisocyanate.

Examples of suitable diisocyanates within the scope of the method according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bisisocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of the dimer fatty acids, or mixtures of two or more of the named diisocyanates.

According to the invention, there is preferably a stoichiometric excess of NCO groups (—NCO) of the polyisocyanates with respect to the hydroxy groups (—OH) of the polyols, "the polyols" and "the polyisocyanates" in each case also encompassing the presence of only one polyol and/or only one polyisocyanate. This stoichiometric excess must exist under the process conditions; i.e., it is not sufficient when the excess is nominally present, but a portion of the NCO groups of the polyisocyanates reacts with reactants other than the OH groups of the polyols, for example with monofunctional alcohols, so that there is a de facto shortage of NCO groups of the polyisocyanates with respect to the OH groups of the polyols. The ratio of the number of OH groups of the polyols to the number of NCO groups of the polyisocyanates is particularly preferably 1:3 to 1:1.1, in particular 1:2.5 to 1:1.5.

A "solvent" is understood to mean a liquid (at room temperature) which is able to bring other gaseous, liquid, or solid substances into solution by physical means without chemically reacting with same. Within the scope of the method according to the invention, the term "solvent" also encompasses a substance which is customarily referred to as a "plasticizer," provided that such a substance is able to dissolve the respective reactants of step (1) and of step (2) of the method according to the invention and to facilitate their reaction with one another without undergoing a chemical reaction itself. The solvent is preferably an aromatic compound or a mixture of various aromatic compounds, for example substituted or unsubstituted benzene, toluene, and/or xylene. The solvent is particularly preferably an alkyl-substituted aromatic compound and/or a mixture of various alkyl-substituted aromatic compounds, particularly preferably $C_{10}$-$C_{20}$ alkyl-substituted benzene. The solvent in step (1) and step (2) of the method according to the invention is preferably present in a proportion of 10-40% by weight, based on the total weight of the reactants used in step (1) or in step (2) of the method according to the invention. The quantities of solvent in step (1) and step (2) of the method according to the invention may be the same or different. Likewise, a different solvent/different solvents may be used in step (1) than in step (2). However, step (2) is preferably carried out immediately following step (1), i.e., without a workup in between, so that the silane of formula (I) is added to the solution which results from step (1).

According to the invention, the reaction product from step (1) of the method according to the invention is reacted with at least one silane of formula (I)

A-R—SiXYZ     (I), wherein A means —NH$_2$ or —NHB, where B stands for a branched or linear alkyl radical which contains 1-12 C atoms and optionally functional groups, for example one or more ester, ether, or amide groups, or stands for a cyclic alkyl radical containing 5-8 C atoms, or an aryl radical preferably containing 6-10 C atoms, R is a divalent hydrocarbon radical containing 1-12 C atoms, and X, Y, Z are substituents on the Si atom and independently stand for $C_1$-$C_8$ alkyl, $C_1$-$C_8$ alkoxy, or $C_1$-$C_8$ acyloxy groups, at least one of the radicals X, Y, Z standing for a $C_1$-$C_8$ alkoxy or $C_1$-$C_8$ acyloxy group.

A in formula (I) preferably means —NHB; i.e., A stands for a secondary amine radical. In this case, the silane of formula (I) is a so-called substituted aminosilane.

The radical R is a divalent hydrocarbon radical containing 1 to 12 C atoms. The hydrocarbon radical is preferably a straight-chain, branched, or cyclic alkylene radical. The hydrocarbon radical may be saturated or unsaturated. R is particularly preferably a divalent hydrocarbon radical containing 1 to 6 C atoms. The curing speed of the composition may be influenced via the length of the hydrocarbon radicals which form one of the links or the link between the polymer structure and the silyl radical. R is very particularly preferably a methylene, ethylene, or n-propylene group, in particular a methylene or n-propylene radical. Alkoxysilane-terminated polymers having a methylene group as the link to the polymer structure, so-called α-silanes, have particularly high reactivity of the terminal silyl group, which results in shorter setting times and thus, very rapid curing of formulations based on such polymers. In general, lengthening the connecting hydrocarbon chain results in reduced reactivity of the polymers. In particular the γ-silanes, which contain the unbranched propylene radical as the link, have a balanced ratio between the required reactivity (acceptable curing times) and retarded curing (open time, possibility for correction after adhesive bonding has taken place). The curing speed of the systems may thus be influenced as desired by a deliberate combination of α- and γ-alkoxysilane-terminated structural units.

The substituents X, Y, and Z directly joined to the Si atom are independently $C_1$-$C_8$ alkyl radicals, $C_1$-$C_8$ alkoxy radicals, or $C_1$-$C_8$ acyloxy radicals. At least one of the radicals X, Y, Z must be a hydrolyzable group, i.e., a $C_1$-$C_8$ alkoxy radical or a $C_1$-$C_8$ acyloxy radical. Alkoxy groups, in particular methoxy, ethoxy, isopropyloxy, and isobutyloxy groups, are preferably selected as hydrolyzable groups. This is advantageous, since no irritating substances that irritate the mucous membranes are released during the curing of compositions containing alkoxy groups. The alcohols formed by hydrolysis of the radicals are harmless in the quantities released, and evaporate. Such compositions are therefore suited in particular for the do-it-yourself sector. However, acyloxy groups such as an acetoxy group —O—CO—CH$_3$ may also be used as hydrolyzable groups.

The resulting alkoxy- and/or acyloxysilane-terminated polymer(s) preferably have/has at least two end groups which result from the reaction of the silane/silanes of formula (I). Each polymer chain thus contains at least two linkage points at which the condensation of the polymers in the presence of atmospheric moisture may take place, with cleavage of the hydrolyzed radicals. Consistent, rapid cross-linking capability is thus achieved, so that adhesive bonds with high strength may be obtained. In addition, the configuration of the achievable network as a long-chain system (thermoplastics), a relatively wide-mesh three-dimensional network (elastomers), or a highly crosslinked system (thermosetting plastics) may be controlled via the quantity and the structure of the hydrolyzable groups, for example by using di- or trialkoxysilyl groups, methoxy groups, or longer radicals, so that, among other things, the elasticity, the flexibility, and the heat resistance of the completed cross-linked compositions may be influenced.

X is preferably an alkyl group and Y and Z are independently an alkoxy group in each case, or X, Y, and Z are independently an alkoxy group in each case. Polymers which contain di- or trialkoxysilyl groups generally have highly reactive linkage points, which allow rapid curing, high degrees of crosslinking, and thus good final strength. The particular advantage of dialkoxysilyl groups is that after curing, the corresponding compositions are more elastic, softer, and more flexible than systems containing trialkoxysilyl groups. They are therefore suited in particular for use as sealants. Furthermore, they cleave even less alcohol during curing, and therefore are of particular interest when the quantity of released alcohol is to be reduced.

In contrast, a higher degree of crosslinking may be achieved with trialkoxysilyl groups, which is particularly advantageous when a harder, more solid mass is desired after the curing. Furthermore, trialkoxysilyl groups are more reactive and therefore crosslink more quickly, and thus reduce the required quantity of catalyst, and they have advantages for "cold flow" of the dimensional stability of an adhesive in question under the influence of force and optionally temperature.

It is particularly preferred that the radicals X, Y, and Z in formula (I) are independently a methyl, an ethyl, a methoxy, or an ethoxy group in each case, at least one of the radicals being a methoxy or ethoxy group. Methoxy and ethoxy groups, as comparatively small hydrolyzable groups with low steric demands, are very reactive and thus allow rapid curing, even when a small amount of catalyst is used. They are therefore of interest in particular for systems in which rapid curing is desired, such as for adhesives which are to have high initial adhesion.

It is particularly preferred that X, Y, and Z are independently a methyl or methoxy group in each case, at least one of the radicals being a methoxy group. Compounds having alkoxysilyl groups have different reactivities in chemical reactions, depending on the nature of the alkyl radicals on the oxygen atom. Within the alkoxy groups, the methoxy group shows the greatest reactivity. Thus, silyl groups of this type may be used when particularly rapid curing is desired. Higher aliphatic radicals such as ethoxy already bring about lower reactivity of the terminal alkoxysilyl group in comparison to methoxy groups, and may be advantageously used for developing graduated crosslinking rates.

Combinations of the two groups also open up interesting configuration options. If, for example, methoxy is selected for X and ethoxy is selected for Y within the same alkoxysilyl group, the desired reactivity of the terminal silyl groups may be adjusted in a particularly finely graduated manner if it is felt that silyl groups bearing solely methoxy groups are too reactive, and silyl groups bearing ethoxy groups are too slow for the intended use.

Of course, in addition to methoxy and ethoxy groups, larger radicals which by their nature have a lower reactivity may also be used as hydrolyzable groups. This is of interest in particular when delayed curing is also to be achieved via the configuration of the alkoxy groups.

A further subject matter of the present invention relates to a silylated polyurethane which is producible by the method according to the invention. By use of a silylated polyurethane according to the invention, compositions may be produced which are characterized by excellent extensibility with a high restoring force.

A further subject matter of the present patent application relates to a curable composition which contains at least one silylated polyurethane according to the invention and at least one filler. Within the scope of the present invention, a "composition" is understood to mean a mixture of at least two ingredients.

The term "curable" is understood such that the composition is able to go from a relatively soft, optionally plastically deformable, state into a harder state under the influence of external conditions, in particular under the influence of moisture that is present in the surroundings and/or intentionally supplied. In general, in addition to the moisture already mentioned, the crosslinking may take place as the result of chemical and/or physical influences, for example also by supplying energy in the form of heat, light, or some other electromagnetic radiation, or also by simply bringing the composition into contact with air or a reactive component.

The solvent which is already used in step (2) and optionally also in step (1) of the method according to the invention may have a plasticizing effect in the composition according to the invention, provided that the solvent is not removed before the composition is produced.

The solvent is preferably not removed, so that the curable composition according to the invention preferably contains at least one solvent. The solvent is preferably an aromatic compound or a mixture of various aromatic compounds, such as substituted or unsubstituted benzene, toluene, and/or xylene. The solvent is particularly preferably an alkyl-substituted aromatic compound and/or a mixture of various alkyl-substituted aromatic compounds, and in particular is preferably a $C_{10}$-$C_{20}$ alkyl-substituted benzene.

The solvent is preferably present in a quantity of 10-40% by weight, particularly preferably in a quantity of 10-30% by weight, based on the total weight of the curable composition. This is preferably the solvent which has already been added during the production of the silylated polyurethane. However, it is also possible for the solvent(s) to be added, in whole or in part, only during production of the curable composition. The curable composition particularly preferably contains 10-40% by weight, preferably 10-30% by weight, of at least one $C_{10}$-$C_{20}$ alkyl-substituted benzene.

For adjusting the elastic properties and for improving the processability of the composition, it may be necessary to add one or more further known plasticizers. A plasticizer is understood to mean a substance which reduces the viscosity of the composition and thus facilitates the processability, and also improves the flexibility and extensibility of the compositions.

The plasticizer is preferably selected from a fatty acid ester, a dicarboxylic acid ester (with the exception of cyclohexane dicarboxylic acid dialkyl ester), an ester of OH group-bearing or epoxidized fatty acids, a fat, a glycol acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, and a chlorinated paraffin, and mixtures of two or more of these. Further advantageous properties of the composition according to the invention, for example gelling capability of the polymers, cold elasticity, and resistance to cold, as well as antistatic properties, may be achieved by the targeted selection of one of these plasticizers or a specific combination.

Of the polyether plasticizers, polyethylene glycols that are closed by end groups are preferred, for example polyethylene glycol or polypropylene glycol di-$C_{1-4}$ alkyl ethers, in particular the dimethyl or diethyl ethers of diethylene glycol or dipropylene glycol, and mixtures of two or more of these. Likewise suitable as plasticizer are, for example, abietic acid esters, butyric acid esters, acetic acid esters, propionic acid esters, thiobutyric acid esters, citric acid esters, and esters based on nitrocellulose and polyvinyl acetate, as well as mixtures of two or more of these. Also suitable, for example, are the asymmetrical esters of adipic acid monooctyl ester with 2-ethylhexanol (Edenol DOA, Cognis Deutschland GmbH, Düsseldorf). Furthermore, the pure or mixed ethers of monofunctional, linear, or branched $C_{4-16}$ alcohols or mixtures of two or more different ethers of such alcohols, for example dioctyl ether, are suitable as plasticizer. Likewise suitable as plasticizer within the scope of the present invention are diurethanes, which may be produced, for example, by reacting diols having OH end groups with monofunctional isocyanates, in that the stoichiometry is selected in such a way that essentially all free OH groups react. Any excess isocyanate may be subsequently removed, for example, by distillation from the reaction mixture. Another method for producing diurethanes is the reaction of monofunctional alcohols with diisocyanates, with preferably all NCO groups reacting.

In principle, phthalic acid esters may also be used as plasticizer, although they are not preferred due to their toxicological potential.

A viscosity of the composition according to the invention which is too high for certain applications may also be easily and advantageously reduced by using a reactive diluent, without demixing (plasticizer migration, for example) occurring in the cured compound. The reactive diluent preferably has at least one functional group which reacts with moisture or atmospheric oxygen, for example, after application. Examples of such groups are silyl groups, isocyanate groups, vinylically unsaturated groups, and multiply unsaturated systems. All compounds that are miscible with the composition according to the invention while reducing the viscosity, and which have at least one group that is reactive with the binder, alone or as a combination of a plurality of compounds, may be used as reactive diluent. The viscosity of the reactive diluent is preferably less than 20,000 mPas, particularly preferably approximately 0.1-6,000 mPas, very particularly preferably 1-1000 mPas (Brookfield RVT, 23° C., spindle 7, 10 rpm).

Examples of substances that may be used as reactive diluent include the following: polyalkylene glycols that are reacted with isocyanatosilanes (for example, Synalox 100-50B, DOW), alkyltrimethoxysilanes, alkyltriethoxysilanes such as methyltrimethoxysilane, methyltriethoxysilane, and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of these compounds. In addition, the following polymers from Kaneka Corp. are likewise usable as reactive diluent: MS 5203H, MS 5303H, MS SAT 010, and MS SAX 350. Also suitable as reactive diluent are polymers which are producible from an organic base structure by grafting with a vinylsilane or by reacting polyol, polyisocyanate, and alkoxysilane.

Aliphatic alcohols which are suitable for producing polyalkylene glycols which in the sense of the preceding paragraph may be further reacted to give reactive diluents include, for example, ethylene glycol, propylene glycol, and higher glycols, as well as other polyfunctional alcohols. The polyols may additionally contain further functional groups such as esters, carbonates, and amides. For producing a reactive diluent by reacting polyol with polyisocyanate and alkoxysilane, the appropriate polyol component is reacted in each case with an at least difunctional isocyanate. In principle, any isocyanate containing at least two isocyanate groups is suitable as an at least difunctional isocyanate, although compounds containing two to four isocyanate groups, in particular two isocyanate groups, are preferred within the scope of the present invention.

Among the alkoxysilyl groups, the di- and trialkoxysilyl groups are preferred.

Examples of suitable polyisocyanates for producing a reactive diluent include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, and mixtures of two or more of these, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI) or the partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate, and the partially or completely hydrogenated cycloalkyl derivatives thereof, 4,4'-diisocyanatophenylperfluorethane, phthalic acid-bis-isocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates, which are obtainable by reacting 2 moles diisocyanate with 1 mole thiodiglycol or dihydroxydihexyl sulfide, the di- and triisocyanates of dimer fatty acids and trimer fatty acids, or mixtures of two or more of the named diisocyanates.

Trivalent or higher-valent isocyanates, which are obtainable, for example, by oligomerization of diisocyanates, in particular by oligomerization of the isocyanates stated above, may likewise be used as polyisocyanates. Examples of such trivalent and higher-valent polyisocyanates are the triisocyanurates of HDI or IPDI or mixtures thereof or mixed triisocyanurates thereof, and polyphenylmethylene polyisocyanate, which is obtainable by phosgenation of aniline-formaldehyde condensation products.

The composition according to the invention may also include a bonding agent. A bonding agent is understood to mean a substance which improves the adhesive properties of adhesive layers on surfaces. Customary bonding agents (tackifiers) known to those skilled in the art may be used, alone or as a combination of a plurality of compounds. Suitable, for example, are resins, terpene oligomers, coumarone/indene resins, aliphatic petrochemical resins, and modified phenol resins. Suitable within the scope of the present invention are, for example, hydrocarbon resins which are obtained by polymerization of terpenes, primarily α- or β-pinene, dipentene, or limonene. These monomers are generally polymerized cationically with initiation by Friedel-Crafts catalysts. Copolymers of terpenes and other monomers, for example styrene, α-methylstyrene, isoprene, and the like are also considered to be terpene resins. The named resins are used, for example, as bonding agent for contact adhesives and coating materials. Likewise suited are the terpene phenolic resins, which are produced by acid-catalyzed addition of phenols to terpenes or colophony. Terpene phenolic resins are soluble in most organic solvents and oils, and are miscible with other resins, waxes, and rubber. Likewise suited within the scope of the present invention as bonding agent in the above-mentioned sense are the colophony resins and derivatives thereof, for example the esters or alcohols thereof. Silane bonding agents, in particular aminosilanes, are particularly well suited.

In one particular embodiment of the curable composition according to the invention, the composition includes a silane of general formula (II)

$$R^1R^2N\text{---}R^3\text{---}SiXYZ \quad (II)$$

as bonding agent, where $R^1$ and $R^2$ are independently hydrogen or $C_1$-$C_8$ alkyl radicals, $R^3$ is a divalent hydrocarbon radical having 1-12 C atoms, optionally containing a heteroatom, and X, Y, Z are independently $C_1$-$C_8$ alkyl, $C_1$-$C_8$ alkoxy, or $C_1$-$C_8$ acyloxy radicals in each case, at least one of the radicals X, Y, Z being a $C_1$-$C_8$ alkoxy or $C_1$-$C_8$ acyloxy group. By their nature, such compounds have a high affinity for the binding polymer components of the curable composition according to the invention, but also for a broad range of polar as well as nonpolar surfaces, and therefore assist in forming a particularly stable bond between the adhesive composition and the particular substrates to be adhesively bonded.

The binding group $R^3$ may be, for example, a straight-chain or branched or cyclic, substituted or unsubstituted, alkylene radical. Nitrogen (N) or oxygen (O) is optionally contained therein as a heteroatom. If X, Y, and/or Z is/are an acyloxy group, this may be the acetoxy group —OCO—$CH_3$, for example.

One or more bonding agents are preferably contained in the curable composition according to the invention in a quantity of 0.1 to 5% by weight, more preferably 0.2 to 2% by weight, in particular 0.3 to 1% by weight, in each case based on the total weight of the composition.

Examples of suitable fillers for the composition according to the invention include chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances.

In addition, organic fillers may also be used, in particular carbon black, graphite, wood fiber, wood flour, sawdust, cellulose, cotton, pulp, wood chips, chopped straw, chaff, ground walnut shells, and other short cut fibers. Moreover, short fibers such as glass fiber, glass filament, polyacrylonitrile, carbon fiber, Kevlar fiber, or also polyethylene fiber may be added. Powdered aluminum is likewise suitable as filler. Furthermore, hollow spheres having a mineral shell or a plastic shell are suitable as fillers. These may be, for example, hollow glass spheres which are commercially available under the trade name Glass Bubbles®. Hollow spheres based on plastic are commercially available under the names Expancel® or Dualite®, for example, and are composed of inorganic or organic substances, each having a diameter of 1 mm or less, preferably 500 μm or less. For some applications, fillers are preferred which impart thixotropy to the preparations. Such fillers are also described as rheological aids, for example hydrogenated castor oil, fatty acid amides, or swellable plastics such as PVC. To allow them to be easily pressed out of a suitable dosing device (a tube, for example), such preparations have a viscosity of 3,000 to 15,000 mPas, preferably 4,000 to 8,000 mPas, or also 5,000 to 6,000 mPas.

The fillers are preferably used in a quantity of 1 to 80% by weight, more preferably 10 to 70% by weight, for example 20 to 60% by weight, in particular 35 to 55% by weight, based on the total weight of the composition according to the invention. An individual filler or a combination of a plurality of fillers may be used.

For example, a highly dispersed silicic acid having a BET surface area of 10 to 500 m$^2$/g is used as filler. During use, a silicic acid of this type does not cause a significant increase in the viscosity of the composition according to the invention, but contributes to strengthening of the cured preparation. For example, the initial strength, the tensile shear strength, and the adhesion of the adhesives, sealants, or coatings in which the composition according to the invention is used are improved via this strengthening. Uncoated silicic acids having a BET surface area of less than 100, more preferably less than 65, m$^2$/g, and/or coated silicic acids having a BET surface area of 100 to 400, more preferably 100 to 300, in particular 150 to 300, and very particularly preferably 200 to 300, m$^2$/g, are preferably used.

Alkali aluminosilicates are preferably used as zeolites, for example sodium-potassium aluminosilicates of the general empirical formula $aK_2O*bNa_2O*Al_2O_3*2SiO*nH_2O$, where 0<a, b<1, and a+b=1. The pore opening of the zeolite or zeolites used is preferably just large enough to admit water molecules. Accordingly, an effective pore opening of the zeolites of less than 0.4 nm is preferred. The effective pore opening is particularly preferably 0.3 nm±0.02 nm. The zeolite(s) is/are preferably used in the form of a powder.

Chalk is preferably used as filler. Cubic, noncubic, amorphous, and other modifications of calcium carbonate may be used as chalk. The chalks used are preferably surface-treated or coated. Preferably used as coating agents are fatty acids, fatty acid soaps, and fatty acid esters, for example lauric acid, palmitic acid, or stearic acid, sodium or potassium salts of such acids, or the alkyl esters thereof. In addition, however, other surface-active substances such as sulfate esters of long-chain alcohols or alkylbenzenesulfonic acids or the sodium or potassium salts thereof, or also coupling reagents based on silanes or titanates, are also suitable. The surface treatment of chalks is frequently associated with an improvement in the processability as well as the adhesive force and the weathering resistance of the compositions. The coating agent is customarily used in a proportion of 0.1 to 20% by weight, preferably 1 to 5% by weight, based on the total weight of the raw chalk.

Precipitated or ground chalks or mixtures thereof may be used, depending on the sought property profile. Ground chalks may be produced, for example, from natural chalk, limestone, or marble by mechanical pulverization; dry or wet methods may be used. Fractions with different average particle sizes are obtained, depending on the grinding process. Advantageous specific surface area (BET) values are between 1.5 m$^2$/g and 50 m$^2$/g.

In addition, the composition according to the invention may contain antioxidants. The content of antioxidants in the composition according to the invention is preferably up to 7% by weight, in particular up to 5% by weight, in each case based on the total weight of the composition. The composition according to the invention may also contain UV stabilizers. The content of UV stabilizers in the composition according to the invention is preferably up to 2% by weight, in particular up to 1% by weight. The so-called hindered amine light stabilizers (HALS) are particularly suitable as UV stabilizers. Within the scope of the present invention, it is preferred to use a UV stabilizer which bears a silyl group and which is incorporated into the end product during crosslinking and curing. The products Lowilite 75 and Lowilite 77 (Great Lakes, US) are particularly suited for this purpose. In addition, benzotriazoles, benzophenones, benzoates, cyanoacrylates, acrylates, sterically hindered phenols, phosphorus, and/or sulfur may also be added.

It is often expedient to further stabilize the composition according to the invention against penetrating moisture in order to further extend the shelf life. Such an improvement in the shelf life may be achieved by the use of drying agents, for example. All compounds which react with water to form a group that is inert with respect to the reactive groups present in the composition, and which in the process preferably experience little change in their molecular weight, are suitable as drying agent. Furthermore, the reactivity of the drying agents with respect to moisture that has penetrated into the composition must be higher than the reactivity of the end groups of the polymer bearing silyl groups according to the invention present in the composition. Isocyanates, for example, are suitable as drying agent.

Silanes are also preferably used as drying agent, for example vinylsilanes such as 3-vinylpropyltriethoxysilane, oxime silanes such as methyl-O,O',O"-butan-2-one-trioximosilane or O,O',O",O'"-butan-2-one-tetraoximosilane (CAS Nos. 022984-54-9 and 034206-40-1, respectively), or benzamidosilanes such as bis(N-methylbenzamido)methylethoxysilane (CAS No. 16230-35-6) or carbamatosilanes such as carbamatomethyltrimethoxysilane. However, the use of methyl-, ethyl-, or vinyltrimethoxysilane or tetramethyl- or tetraethylethoxysilane is also possible. With regard to efficiency and costs, vinyltrimethoxysilane and tetraethoxysilane are particularly preferred here. Likewise preferred as drying agent are the above-mentioned reactive diluents, provided that they have a molecular weight ($M_n$) of less than approximately 5,000 g/mol and have end groups whose reactivity with respect to penetrated moisture is at least as high, preferably higher, than the reactivity of the reactive groups of the polymer bearing silyl groups according to the invention. Lastly, alkyl orthoformates, for example methyl or ethyl orthoformate, or orthoacetates, for example methyl or ethyl orthoacetate, may also be used as drying agent. The composition according to the invention preferably contains 0.01 to 10% by weight drying agent, based on the total weight of the composition.

The composition according to the invention preferably contains the following components in the weight fractions stated:
Silylated polyurethane according to the invention 10-40% by weight
Solvent 10-30% by weight
Filler 20-60% by weight
Curing catalyst 0.01-1% by weight
Auxiliary substances 0-10% by weight,
where the weight fractions add up to 100% by weight, and are based on the total weight of the curable composition. The terms "solvent," "filler," and "curing catalyst" used above in each case also encompass a mixture of various solvents, fillers, and/or curing catalysts, respectively.

Besides the components already listed, the composition according to the invention may contain, for example, stabilizers, UV stabilizers, aging protection agents, rheological aids, color pigments or color pastes, fungicides, and/or flame retardants as auxiliary substances.

The composition according to the invention is produced according to known methods by intimately mixing the components in suitable dispersion units, for example a high-speed mixer.

A further subject matter of the present invention relates to use of the curable composition according to the invention as an adhesive, sealant, and/or coating.

In principle, all features discussed within the scope of the present text, in particular the embodiments, quantity ranges, components, and other features of the composition according to the invention identified as preferred and/or special, and the uses according to the invention in all possible, not mutually exclusive, combinations may be implemented in the present invention, wherein combinations of features identified as preferred and/or special are likewise regarded as preferred and/or special.

The invention claimed is:

1. Method for producing a silylated polyurethane, comprising the following steps:
   (1) mixing at least one polyether polyol having a number average molecular weight of 10,000 to 16,000 g/mol with at least one polyisocyanate and at least one solvent;
   (2) reacting the at least one polyether polyol having a number average molecular weight of 10,000 to 16,000 g/mol with the at least one polyisocyanate in the presence of the at least one solvent to form a reaction product, wherein the solvent includes an aromatic compound comprising a $C_{10}$-$C_{20}$ alkyl group;
   (3) reacting the reaction product from step (2) with at least one silane of formula (I)

A-R—SiXYZ (I), wherein A means —$NH_2$ or —NHB, where B stands for a branched or linear alkyl radical which contains 1-12 C atoms and optionally functional groups, or stands for a cyclic alkyl radical containing 5-8 C atoms, or an aryl radical, and
   R is a divalent hydrocarbon radical containing 1-12 C atoms, and
   X, Y, Z are substituents on the Si atom and independently stand for $C_1$-$C_8$ alkyl, $C_1$-$C_8$ alkoxy, or $C_1$-$C_8$ acyloxy groups, at least one of the radicals X, Y, Z standing for a $C_1$-$C_8$ alkoxy or $C_1$-$C_8$ acyloxy group,
   in the presence of at least one solvent, wherein the solvent includes an aromatic compound comprising a $C_{10}$-$C_{20}$ alkyl group.

2. Method according to claim 1, wherein the solvent is a $C_{10}$-$C_{20}$ alkyl-substituted benzene.

3. Method according to claim 1, wherein R in formula (I) is a methylene, ethylene, or n-propylene group.

4. A curable composition consisting of the following components in the corresponding weight fractions:
   10-40% by weight of silylated polyurethane produced by
      (1) reacting at least one polyether polyol having a number average molecular weight of at least 2,000 g/mol with at least one polyisocyanate in the presence of at least one solvent, wherein the solvent includes an aromatic compound comprising a $C_{10}$-$C_{20}$ alkyl group;
      (2) reacting the reaction product from step (1) with at least one silane of formula (I)

A-R—SiXYZ (I), wherein A means —$NH_2$ or —NHB, where B stands for a branched or linear alkyl radical which contains 1-12 C atoms and optionally functional groups, or stands for a cyclic alkyl radical containing 5-8 C atoms, or an aryl radical, and
      R is a divalent hydrocarbon radical containing 1-12 C atoms, and
      X, Y, Z are substituents on the Si atom and independently stand for $C_1$-$C_8$ alkyl, $C_1$-$C_8$ alkoxy, or $C_1$-$C_8$ acyloxy groups, at least two of the radicals X, Y, Z standing for a $C_1$-$C_8$ alkoxy or $C_1$-$C_8$ acyloxy group, in the presence of at least one solvent, wherein the solvent includes an aromatic compound comprising a $C_{10}$-$C_{20}$ alkyl group;
   10-30% by weight solvent
   10-80% by weight filler
   0.01-1% by weight curing catalyst
   0-10% by weight auxiliary substances
where the weight fractions add up to 100% by weight, and are based on the total weight of the curable composition.

5. A curable composition according to claim 4, wherein the polyether polyol has a number average molecular weight of 7,000 g/mol to 16,000 g/mol.

6. A curable composition according to claim 4, wherein the filler is calcium carbonate.

7. The curable composition of claim 4 being an adhesive, sealant, and/or coating.

* * * * *